April 3, 1956

L. FRIERI 2,740,143

APPARATUS FOR APPLYING RUBBER SOLES TO
ARTICLES OF RUBBER FOOTWEAR

Filed May 7, 1951

INVENTOR.
LUIGI FRIERI

BY
Young, Emery & Thompson
ATTYS

United States Patent Office 2,740,143
Patented Apr. 3, 1956

2,740,143
APPARATUS FOR APPLYING RUBBER SOLES TO ARTICLES OF RUBBER FOOTWEAR

Luigi Frieri, Turin, Italy, assignor to "Superga" Societa per Azioni, Turin, Italy Application May 7, 1951, Serial No. 224,959
Claims priority, application Italy May 10, 1950
1 Claim. (Cl. 12—33)

This invention relates to an apparatus for applying rubber soles to articles of rubber footwear.

Apparatus for the application of a uniform pressure to a surface (flat or otherwise) by means of a liquid or gaseous fluid under pressure are already known.

It is also known in such apparatus to apply the pressure to the surface to be submitted to it through the intermediary of a flexible elastic membrane interposed between the surface and the source of fluid under pressure, said membrane being capable of accommodating itself exactly to the shape of the surface by the pressure upon it of the fluid under pressure, with the result that uniformity of pressure over the entire area of the surface is ensured irrespective of the shape and irregularity of the surface.

It is further known in a general way to employ this apparatus, involving the use of a flexible elastic membrane, in the manufacture of articles of rubber footwear, and the present invention sets out to employ it specifically in the application of a rubber sole to a pre-formed upper-insole unit of an article of rubber footwear (more particularly a rubber overshoe) of the type in which the sole is secured to said unit adhesively and a marginal portion of the sole is upturned over the lower part of the upper.

In the manufacture of rubber footwear, particularly rubber overshoes, the final operation consists in fixing to the insole of the overshoe or the like (which has been previously assembled with the upper thereof) a rubber sole whose marginal portion is upturned over the lower part of the upper. The operation of turning up the marginal portion of the sole and causing it to adhere firmly to the upper has hitherto been carried out by hand. It is, however, a long and tedious operation, requiring the use of special tools and a certain degree of skill on the part of the operator, to ensure particularly that no air bubbles remain between the upper and the turned up marginal portion of the sole. The operation tends therefore considerably to increase the cost of production of the footwear.

The apparatus according to the invention is advantageous over the known hand method in that it ensures perfect adhesion of the marginal portion of the sole to the upper with complete elimination of air bubbles between the surfaces thus joined together, and this with great speed and accuracy of execution, and moreover without the necessity of employing specialised labour.

The apparatus according to the invention comprises a frame upon which is mounted a work plate occupying a generally horizontal position in the frame, a frame upon which is carried a flexible elastic membrane capable of forming with the work plate a fluid-tight chamber containing a last and the footwear parts in position thereon, and means for evacuating said chamber, the membrane being adapted upon evacuation of the chamber to accommodate itself under the pressure upon it of a gaseous medium (e. g. the atmosphere) external to the chamber, exactly to the shape of the last and the footwear parts in position thereon.

Further according to the invention, the construction may be one in which, when the frame carrying the membrane is in operative position with respect to the frame carrying the work plate, the membrane overlies an upwardly directed supporting surface on the work plate disposed at the level of the joint between the two frames and having in it an opening through which the last, with the footwear parts in position upon it, projects in the upward direction from the work plate, said opening being of a size, shape and position to leave a gap between its edge and the surface of the last. With such a construction the last would project high enough above the level of the supporting surface to enable the membrane to fold back and cause the marginal portion of the sole to adhere firmly to the upper in the manner above described.

As in the particular embodiment of the invention hereinafter described, the fluid-tight chamber may be connected to a source of vacuum (which term includes reduced pressure of any necessary degree of reduction of pressure for the purposes of the process) by way of a three-way valve, in one setting of which the chamber is in communication with the source and cut off from communication with the gaseous medium (e. g. the atmosphere) external to the membrane, and in the other the chamber is cut off from the vacuum source and placed in communication with said gaseous medium.

The invention will now be further described with reference to the accompanying drawings, which illustrate a preferred embodiment by way of example.

In these drawings.

Like reference numerals indicate like parts in the various figures.

Figure 1:
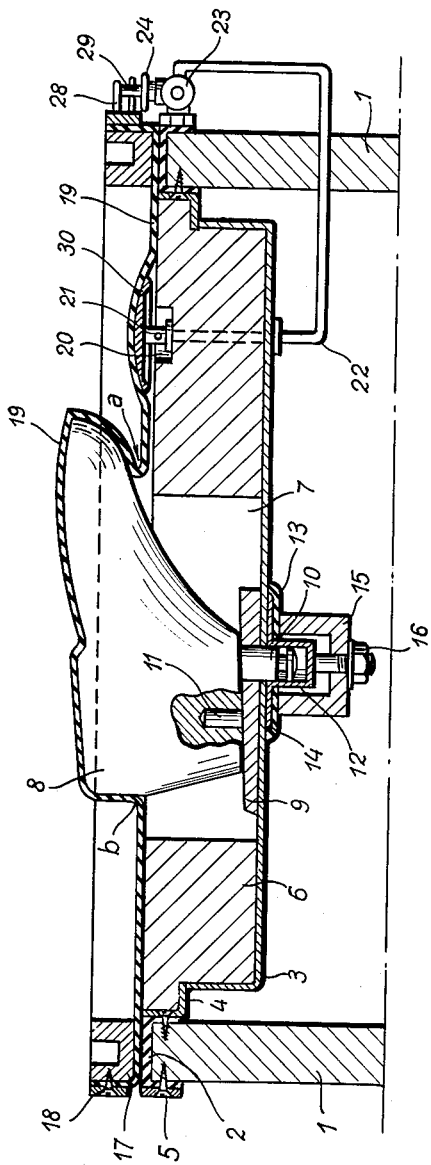
Figure 1 is a longitudinal vertical section through the apparatus which is used in carrying the method of the invention into effect.
Figure 2:
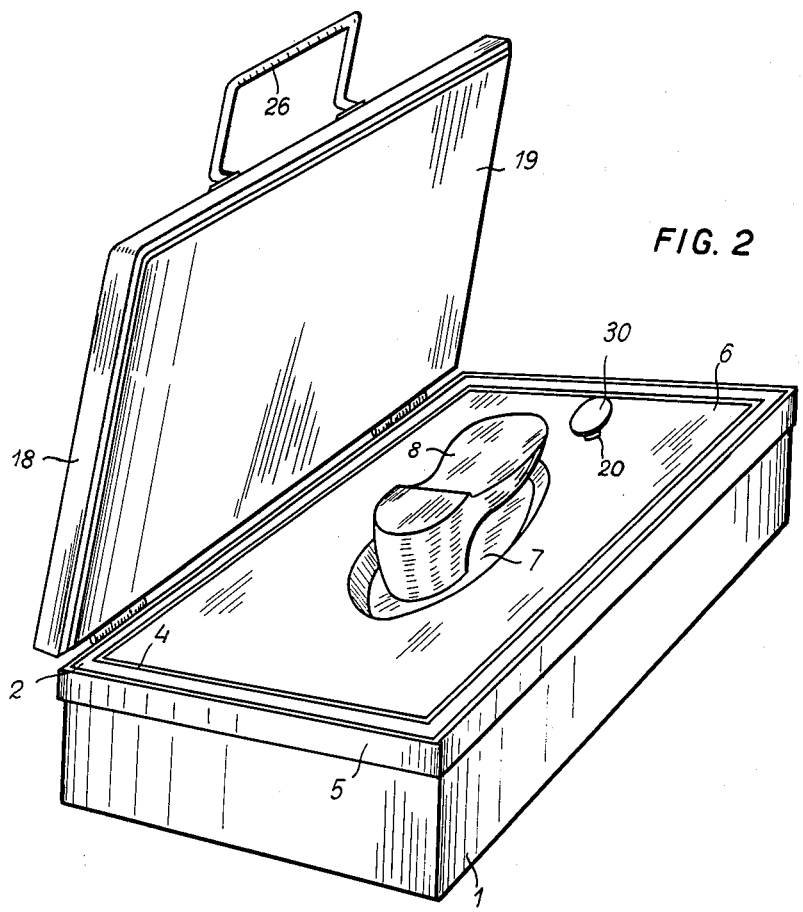
Figure 2 is a perspective view of the apparatus.
Figure 3:
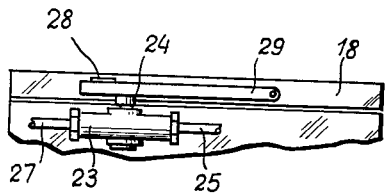
Figure 3 is a fragmentary view of the apparatus illustrating a constructional detail thereof hereinafter described.

Referring to the drawings, the apparatus shown comprises a rigid base frame 1 sheathed along the upper edge thereof with a rubber gasket 2.

Within the frame and carried thereon is a metal work plate 3 of dished formation, bounded along the upper edge of the dish by an angle section flange 4 by which the work plate is secured to the frame 1, the inner flange of the gasket 2 being sandwiched between the vertical portion of the flange 4 and the adjacent face of the frame 1 in the manner clearly shown in Figure 1 of the drawings, while the outer flange of the gasket is held in position against the outer face of the frame by a metal band 5 secured thereto.

Within the work plate 3 is a wooden filling 6, the upper surface of which is flush with the top of the frame 1. The said upper surface of the filling 6 constitutes the "supporting surface" hereinbefore referred to which is overlain by the membrane when the apparatus is in use.

Near the centre of the wooden filling 6 is an opening 7 therein extending completely therethrough. As shown, this opening conforms approximately to the shape of the last, which is marked 8, its size being such, however, as to leave a gap between the edge of the opening and the surface of the last.

The lower part of the last 8 occupies the opening 7 in the manner shown in the drawing, the last being mounted upon the work plate 3 through the intermediary of a bed block 9 in turn mounted upon the upwardly presented face of the work plate, to which upwardly presented face it is permanently affixed.

As shown, the last is disposed in an upside down position, its upper portion projecting through the top of the opening 7 above the level of the "supporting surface" aforesaid constituted by the upper surface of the filling 6.

The last is held in place with respect to the bed block 9 by means of a spigot 10 co-operating with a locating pin 11. As shown, the spigot 10, which is carried on the last, projects downwardly from the bottom of the last through a hole in the bed block and a second hole in alignment therewith in the work plate 3, and into a socket 12 carried upon the work plate and projecting downwardly from the underside thereof. The locating pin 11, which is carried by the bed block 9, projects upwardly therefrom into a co-operating recess provided to receive it in the underside of the last. The fit as between the spigot and the socket on the one hand and the locating pin and recess on the other is such as to enable the last to be readily removed from the bed block and replaced thereon by a simple upward or, as the case may be, downward movement of the last relatively to the bed block in a vertical direction, while at the same time ensuring immovability of the last with respect to the bed block as regards any movement other than vertical movement. In this way a construction is provided in which it is readily possible to fit a last in position in the apparatus and, when required, to replace it by another therein.

In order to ensure fluid-tightness of the work plate in the neighbourhood of the socket 12 a rubber disc 13 is compressed against the joining flange 14 of the socket 12 by means of a cap 15 retained in place by a nut 16 screwed on to a threaded leg projecting downwardly from the bottom of the socket and affixed thereto. Alternatively to such an arrangement, the necessary hermetic seal could be obtained by using a single sheet of rubber underlying the whole of the work plate 3 including the socket 12, and extending up between the sides of the work plate and the frame 1, and then over the upper edge of the frame 1, being clamped in position where it extends over such upper edge in a manner similarly to the gasket 2 of the construction illustrated.

To the frame 1 is hinged a second or upper frame 17 to which is fixed, by means of a metal band 18, a sheet of rubber 19 which, when the frame 17 is in the turned down (operative) position in which it appears in Figure 1, hermetically closes the chamber constituted by the interior space of the dished work plate 3, the sheet 19 (which as will be understood constitutes the "flexible elastic membrane" of the apparatus as hereinbefore referred to) forming in effect one of the bounding walls of said chamber.

In the upper face of the wooden filling 6 is a small recess 20 in which is located a suction unit 21. The unit 21 is connected by piping 22 to a three-way valve 23, the valve 23 being mounted upon the band 5 so as to be in fixed relation to the frame 1.

The movable element of the valve 23 is fast with a part 24 which is yieldingly urged in the upward direction. When said movable valve part is in the rest position, which is the raised position, the space between the membrane 19 and the work plate is placed in communication with the ambient atmosphere by means of a conduit 25 leading to one of the inlet ports of the valve, the other inlet port of the valve being now closed.

When the frame 17 is, by means of a handle 26 thereon, lowered to its operative (lowered) position with respect to the frame 1 and pressed against this latter frame, the part 24 of the valve becomes depressed to its lowered position in the valve, with the result that the space beneath the membrane becomes cut off from the ambient atmosphere and placed in communication with a source of vacuum by way of piping 27, there being virtually an operative connection between the frame 17 and the valve, consisting of the part 24 already mentioned, a lug 28 projecting laterally from the face of the metal band 18 and a lever 29 pivoted to the band 18 and so positioned as to intervene at the free end of the lever between the parts 24 and 28.

In order to prevent the membrance 19 from closing over the orifices of the suction unit 21 when the suction is applied thereto, the unit carries a protective disc 30 adapted as shown to intercept the downward movement of the membrane in the immediate neighbourhood of the recess 20, thereby ensuring that there shall be free access for the escape of air from the space beneath the membrane to the orifices of the suction unit.

Figure 4:
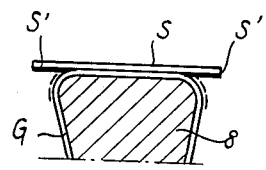
Figure 4 is a fragmentary cross-section through a last with the footwear parts in position thereon, the sole element of said parts being not yet folded back on to the upper.

To apply the rubber sole, which is marked S in Figure 4, to the pre-formed upper-insole unit G of, for example, a rubber overshoe, the unit is mounted on the last 8 with the insole facing in the upward direction, and on it is placed the sole S in such a position that the marginal portion of the sole projects slightly beyond the edge of the upper-insole unit. The frame 17 is then lowered to its operative position and fastened therein, this operation occasioning in the manner above described the placing of the working chamber formed by the space between the membrane 19 and work plate 3 automatically into communication with the source of vacuum. In this way a depression is created between the work plate and the membrane, with the result that the pressure of the external atmosphere presses the membrane firmly down on to the sole and around the upper marginal portion of the upper-insole unit in position on the last. The folding down of the marginal portion of the sole to its correct position over the outer face of the upper is effected by exercising at the same time a stretching action starting at the central part of the sole and working laterally outwards therefrom, said stretching action being the result of an inward thrust upon the membrane at $a$ and $b$ in Figure 1. This effect is very advantageous in that it ensures the complete elimination of the possibility of air voids forming between the surfaces to be united due to the reduced pressure obtaining within the working chamber and at the same time it exercises a flattening action on the sole and the upper.

The folding down of the marginal portion $S^1$ of the sole in the manner above described is obtained practically instantaneously, and the perfect adhesion of the sole to the upper is ensured, with the result that the overshoe can be removed from the last after a few seconds and replaced by another upper-insole unit. For this purpose it is sufficient simply to raise the frame 17 so that the space beneath the membrane 19 becomes placed in communication with the external atmosphere again by the action of the valve 23—thereby reestablishing atmospheric pressure around the last and the overshoe in position thereon, with the result that the membrane automatically detaches itself therefrom immediately. If desired the lever 29 may be flexible, thereby enabling the reestablishing of atmospheric pressure around the last and the overshoe to be effected merely by pulling the lever outwardly, away from the frame 17, sufficiently to remove it from the path of the movable valve element 24, which thereupon rises and places the space beneath the membrane into communication with the ambient atmosphere. The frame 17 can now be lifted freely.

When it is necessary to manufacture a type of footwear having a substantially different shape from that of an overshoe, for example a top boot, a similar form of apparatus is employed but with suitably different dimensions.

It will be appreciated that although the particular embodiment of the invention described above and shown in the drawings represents generally speaking a preferred embodiment of the invention, various constructional modifications are possible without departure from the general principle of the invention. For example, the constructional details of the frames 1 and 17 may be different from those illustrated in the drawings, as also may be the constructional details of the work plate, the manner of securing the elastic membrane and the manner of detachably mounting the last on the work plate. All such modifications are to be understood as within the scope of the invention as delineated in the following statement of claim.

What I claim is:

Apparatus for applying a rubber sole to footwear, more particularly to a rubber overshoe, comprising in combination a rigid base frame, a rubber gasket sheathing the upper edge of said frame, an angle section annular flange fitted in said frame near its upper edge, means for securing said flange to said frame, a work plate of dished formation bounded along its upper edge by the said flange, the bottom of said work plate being spaced from the plane passing through the lower edge of said rigid base frame, means for locking at the bottom of said work plate and inwardly thereof an upturned last carrying the shoe upper to which the sole shall be applied, in a position in which the part of the footwear that does not receive the sole is arranged below the level of the upper surface of said rubber gasket, a wooden plate superimposed on said work plate provided with a hole for the passage of the last, bearing on the bottom of said work plate and of a height such that its upper surface is flush with the upper surface of the rubber gasket sheathing the upper edge of said frame, an upper frame hinged to said rigid base frame, a flexible resilient membrane stretched in said upper frame and overlapping by its marginal portion the lower edges of said upper frame and bearing on the upper surface of said rubber gasket sheathing the upper edges of said rigid base frame, whereby an air tight chamber enclosing the last and footwear fitted thereon is formed, said chamber being connected by a pipe extending out through the base frame wall and connected with a three-way valve secured externally of the base frame, one outlet of which is connected to a vacuum source, its other outlet communicating with the atmosphere, said valve being maintained in a position in which it connects said pipe with the vacuum source by the pressure exerted by a lever pivoted to the outer side of the upper frame on a control member of the valve protruding from the valve casing and yieldably urged upwardly, said lever being made from resilient material and held in position by a lug fast with the upper frame abutting the upper edge of said lever near the free end of the latter.

References Cited in the file of this patent

UNITED STATES PATENTS

| | | |
|---|---|---|
| 1,494,706 | Polleys | May 20, 1924 |
| 1,895,941 | Ritchey | Jan. 31, 1933 |
| 2,088,352 | Vierkotter | July 27, 1937 |
| 2,111,688 | Weir | Mar. 22, 1938 |
| 2,317,151 | Macdonald | Apr. 20, 1943 |
| 2,620,289 | Douglas | Dec. 2, 1952 |